Feb. 19, 1952  B. B. TEETER  2,585,976
VEHICLE BODY
Filed May 2, 1947  12 Sheets-Sheet 1
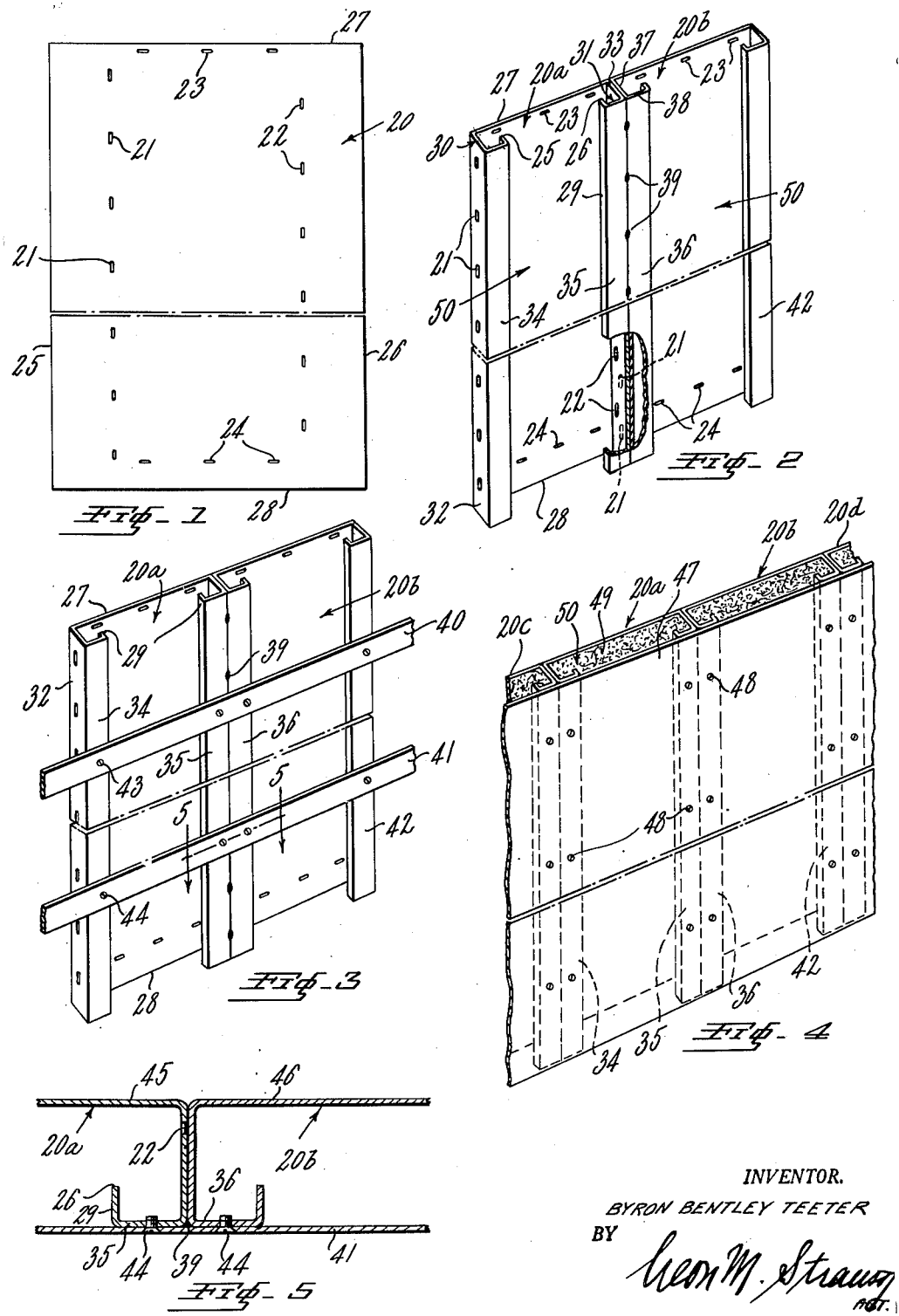
INVENTOR.
BYRON BENTLEY TEETER
BY

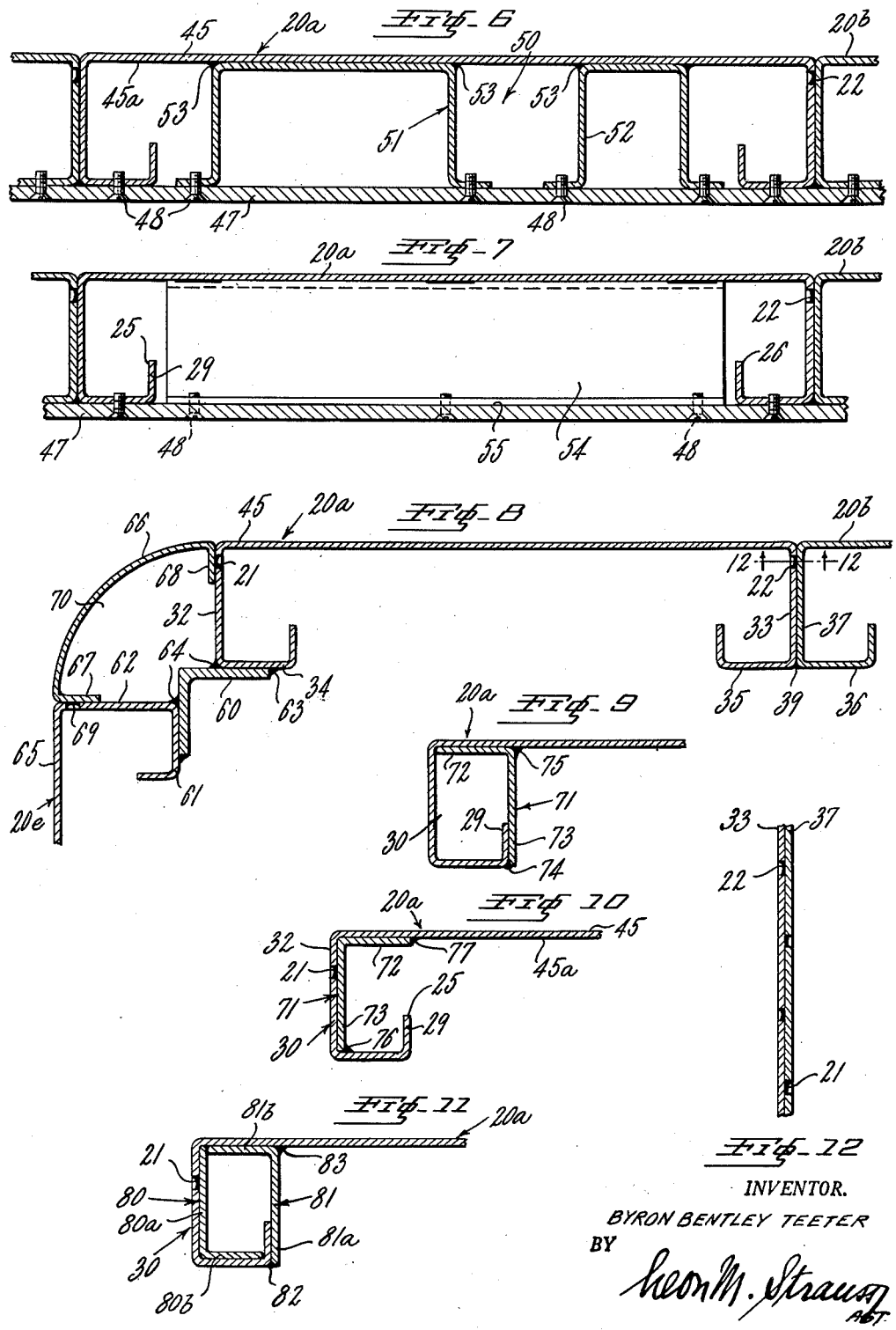

Feb. 19, 1952     B. B. TEETER     2,585,976
VEHICLE BODY
Filed May 2, 1947     12 Sheets-Sheet 3
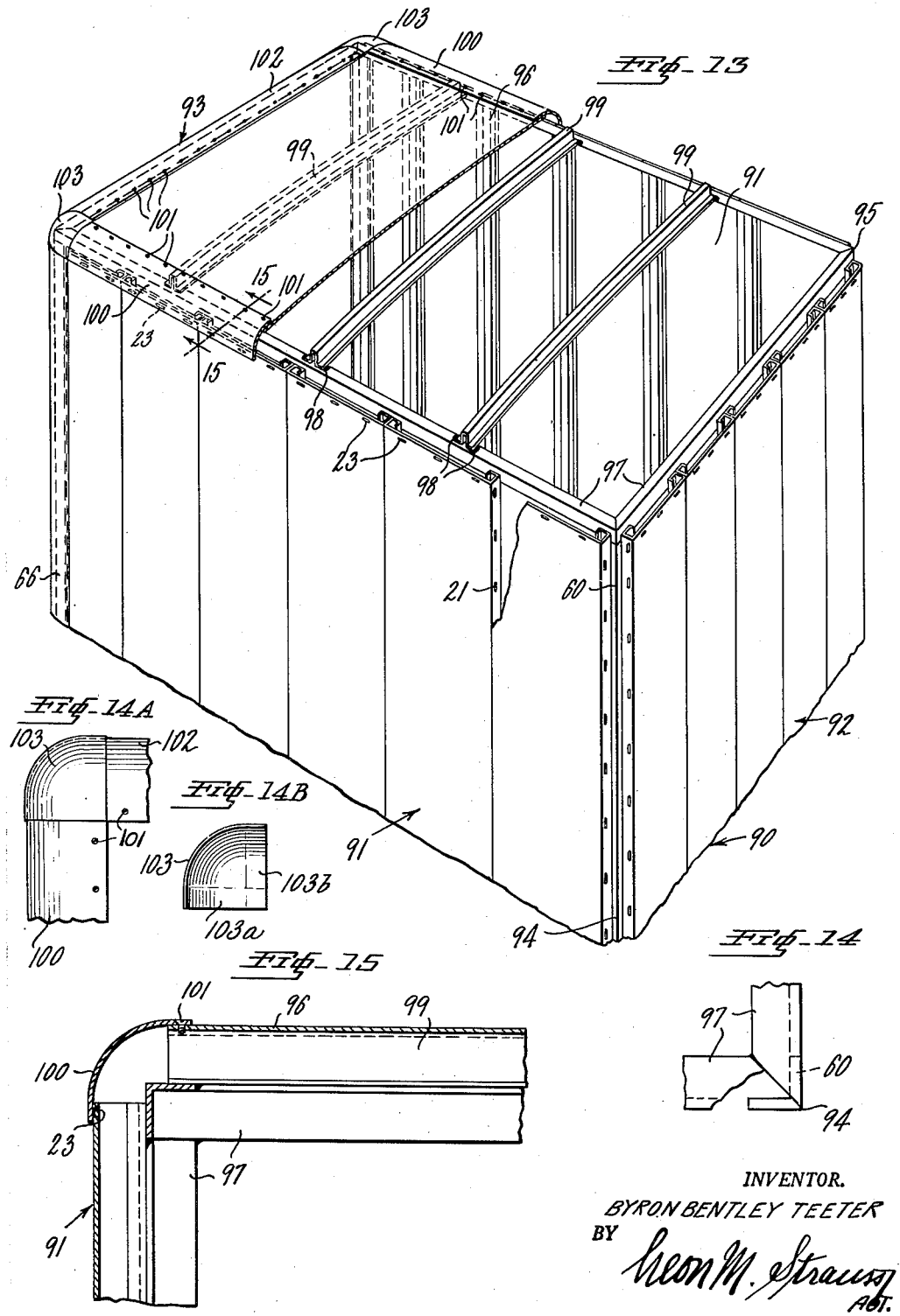
INVENTOR.
BYRON BENTLEY TEETER
BY
Leon M. Strauss
AGT.

Feb. 19, 1952 B. B. TEETER 2,585,976
VEHICLE BODY
Filed May 2, 1947 12 Sheets-Sheet 4
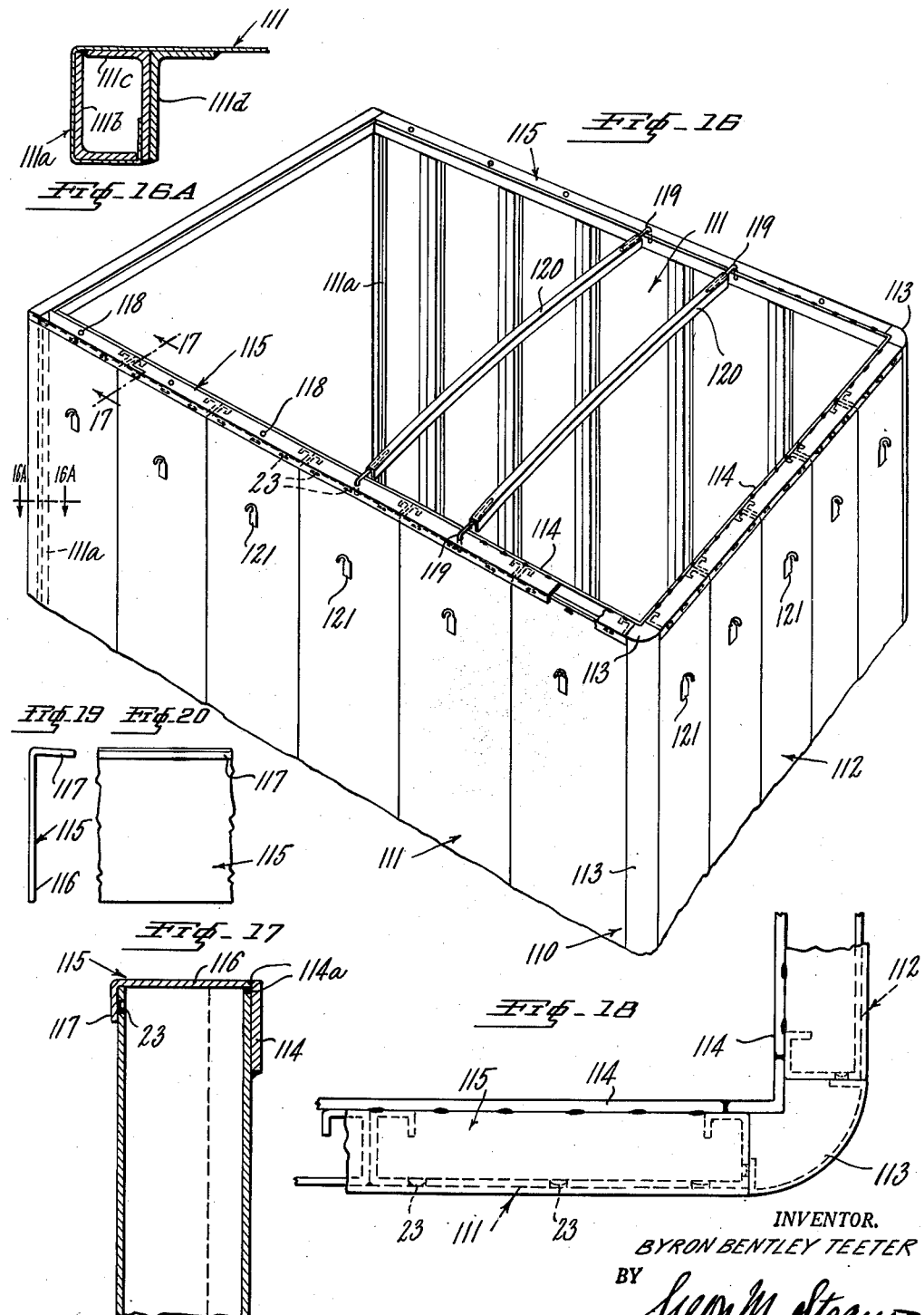
INVENTOR.
BYRON BENTLEY TEETER
BY Leon M. Strauss
AGT.

Feb. 19, 1952          B. B. TEETER                    2,585,976
                        VEHICLE BODY
Filed May 2, 1947                              12 Sheets-Sheet 5
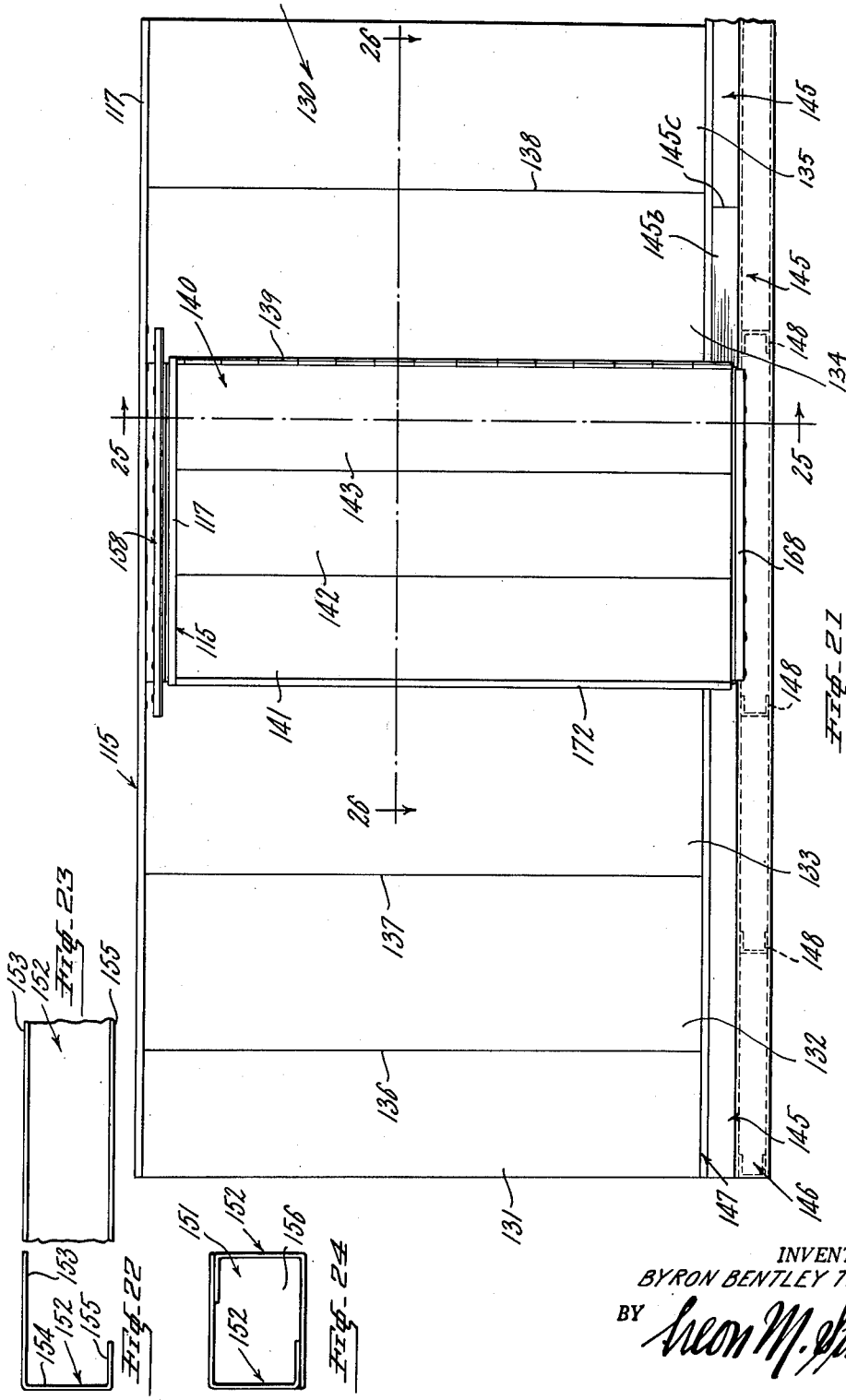
INVENTOR.
BYRON BENTLEY TEETER
BY Leon M. Strauss Feb. 19, 1952　　　　　B. B. TEETER　　　　　2,585,976
VEHICLE BODY
Filed May 2, 1947　　　　　　　　　　　　　12 Sheets-Sheet 6
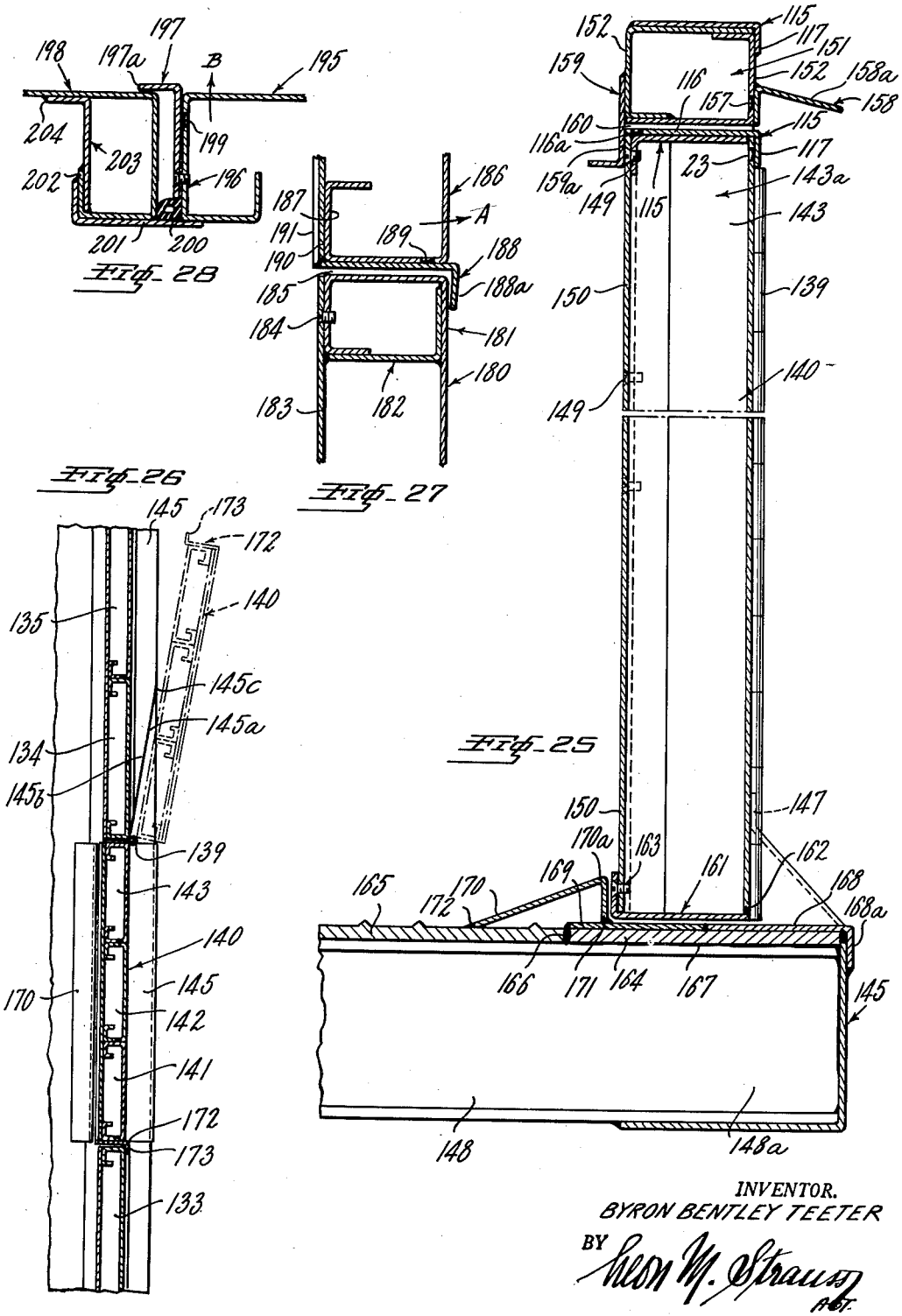
INVENTOR.
BYRON BENTLEY TEETER
BY Leon M. Strauss

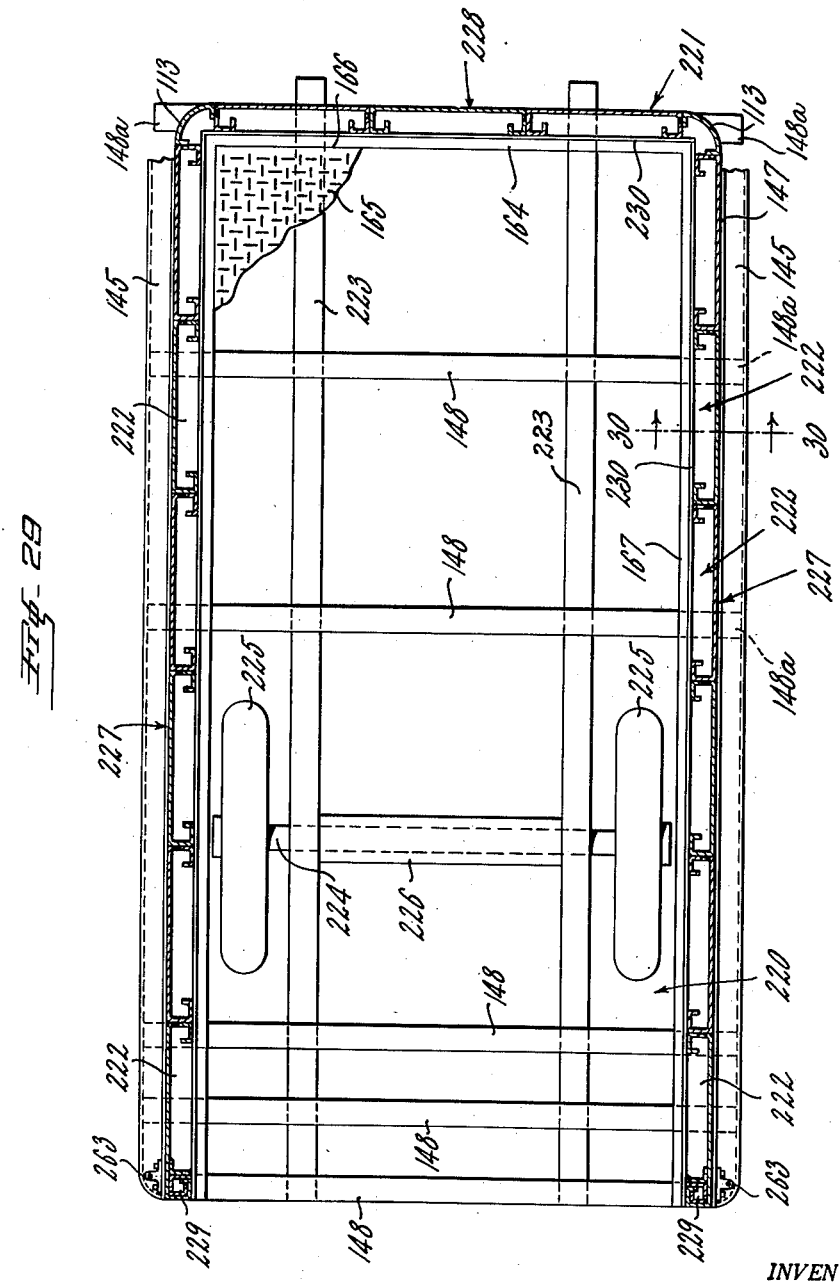

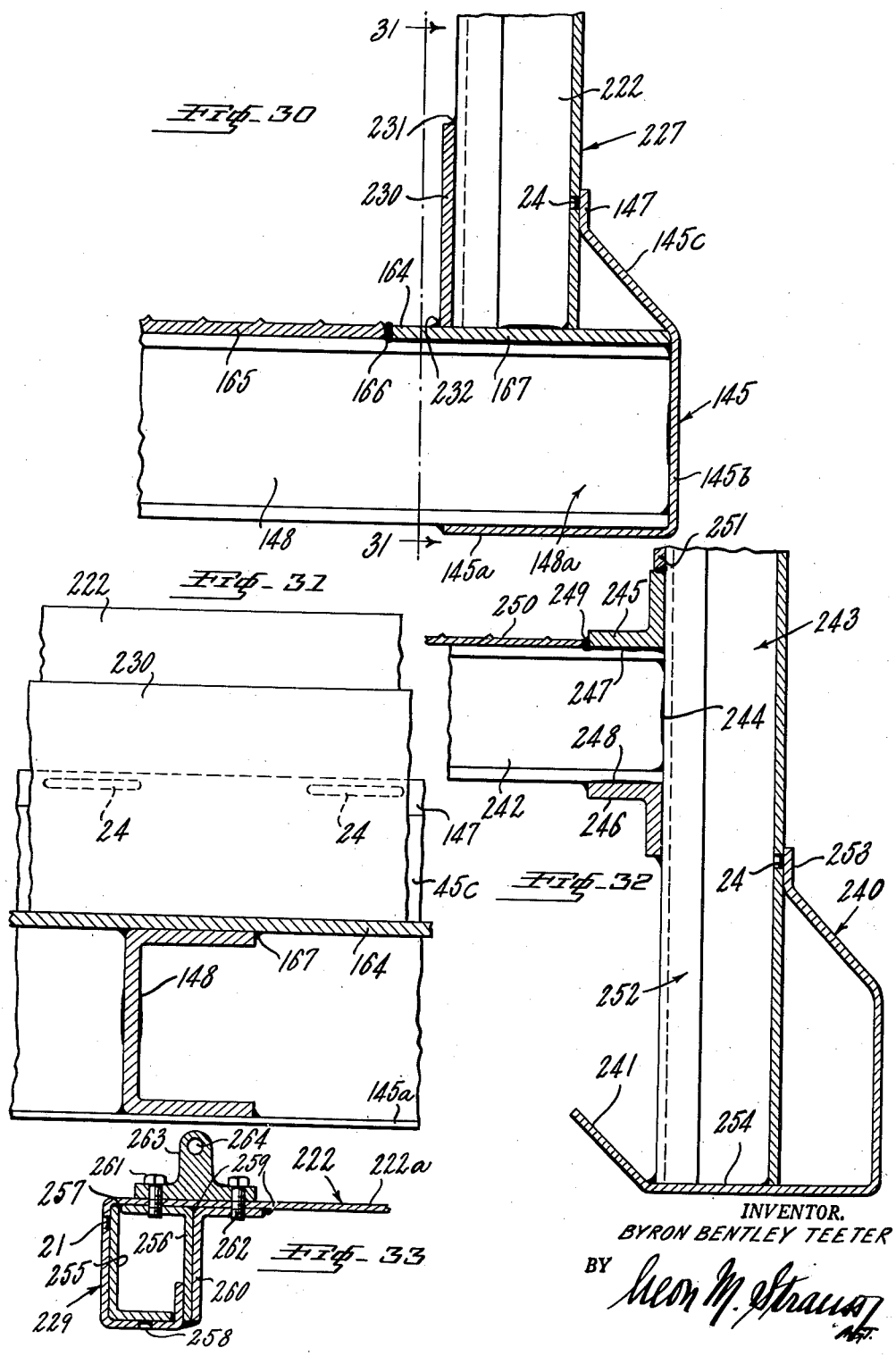

Feb. 19, 1952   B. B. TEETER   2,585,976
VEHICLE BODY
Filed May 2, 1947   12 Sheets-Sheet 9
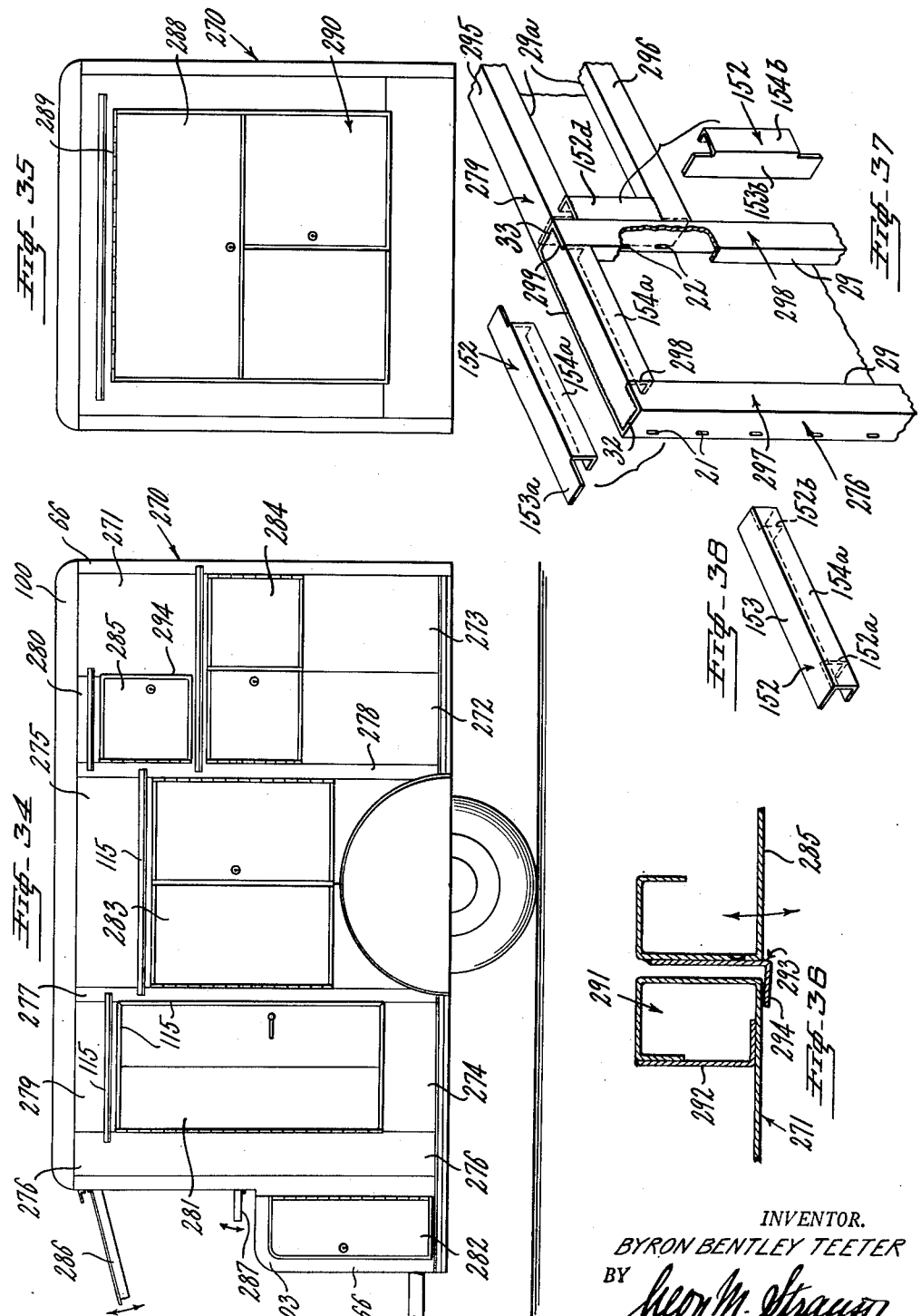
INVENTOR.
BYRON BENTLEY TEETER
BY

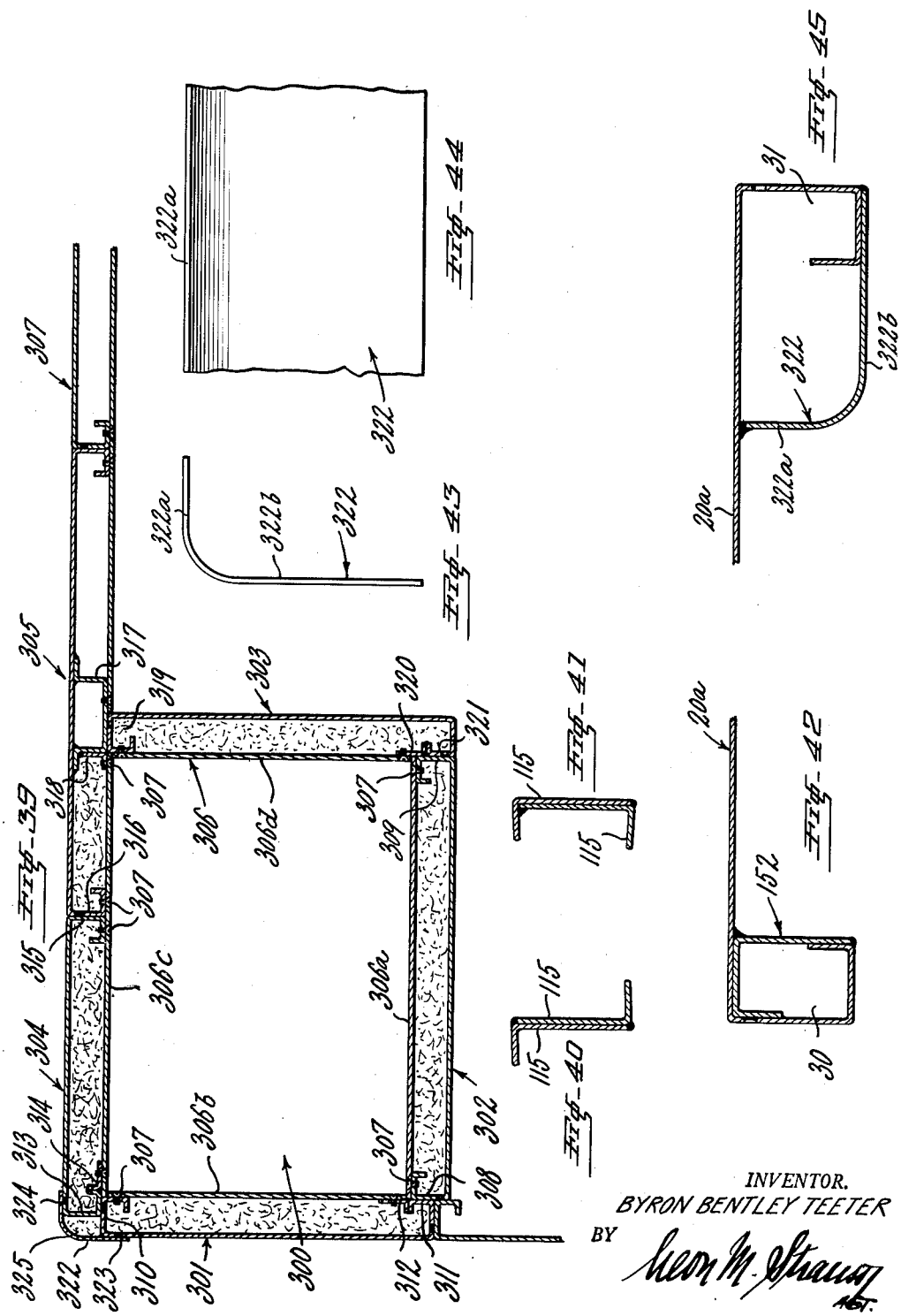

Feb. 19, 1952    B. B. TEETER    2,585,976
VEHICLE BODY
Filed May 2, 1947    12 Sheets-Sheet 11
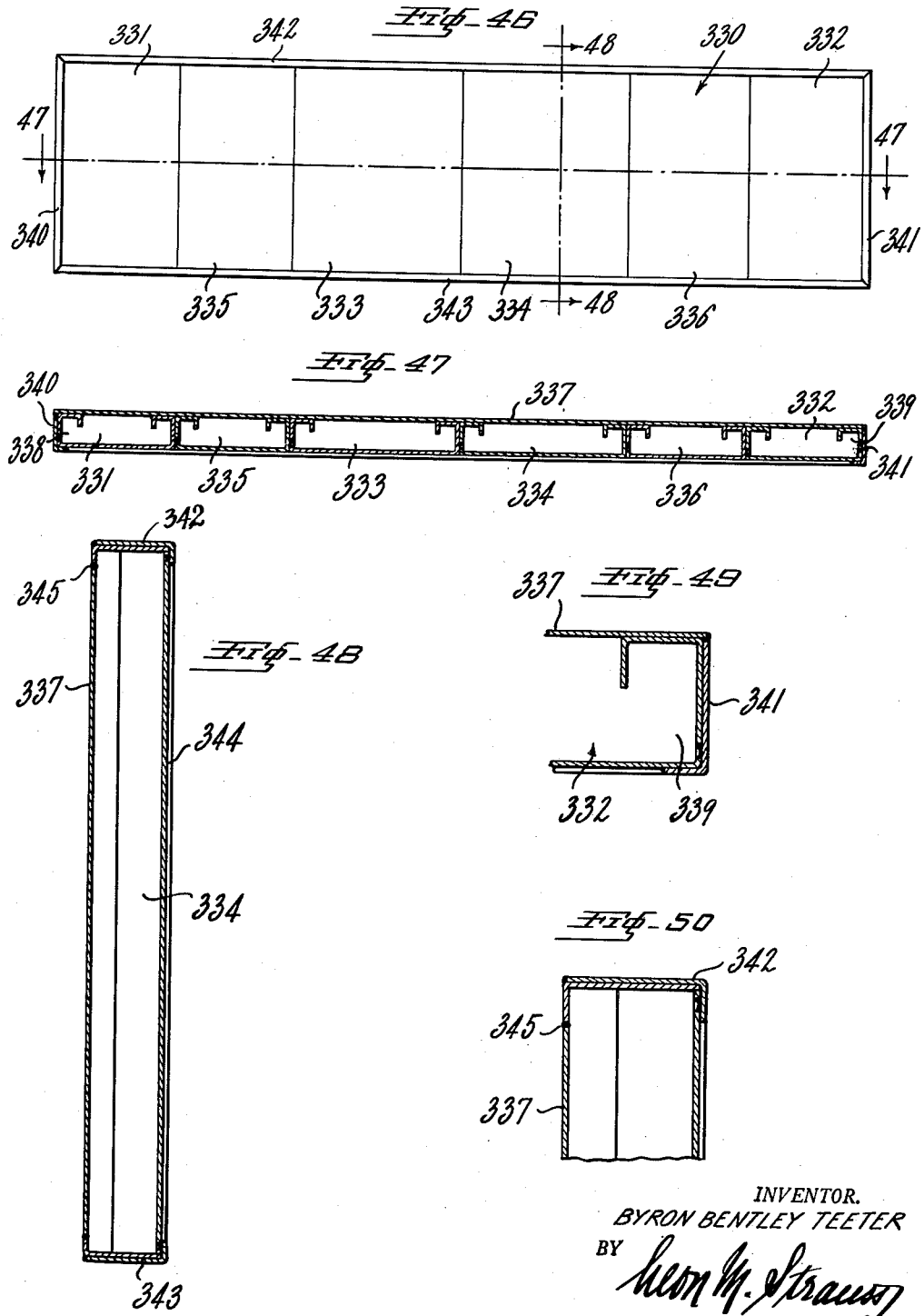
INVENTOR.
BYRON BENTLEY TEETER

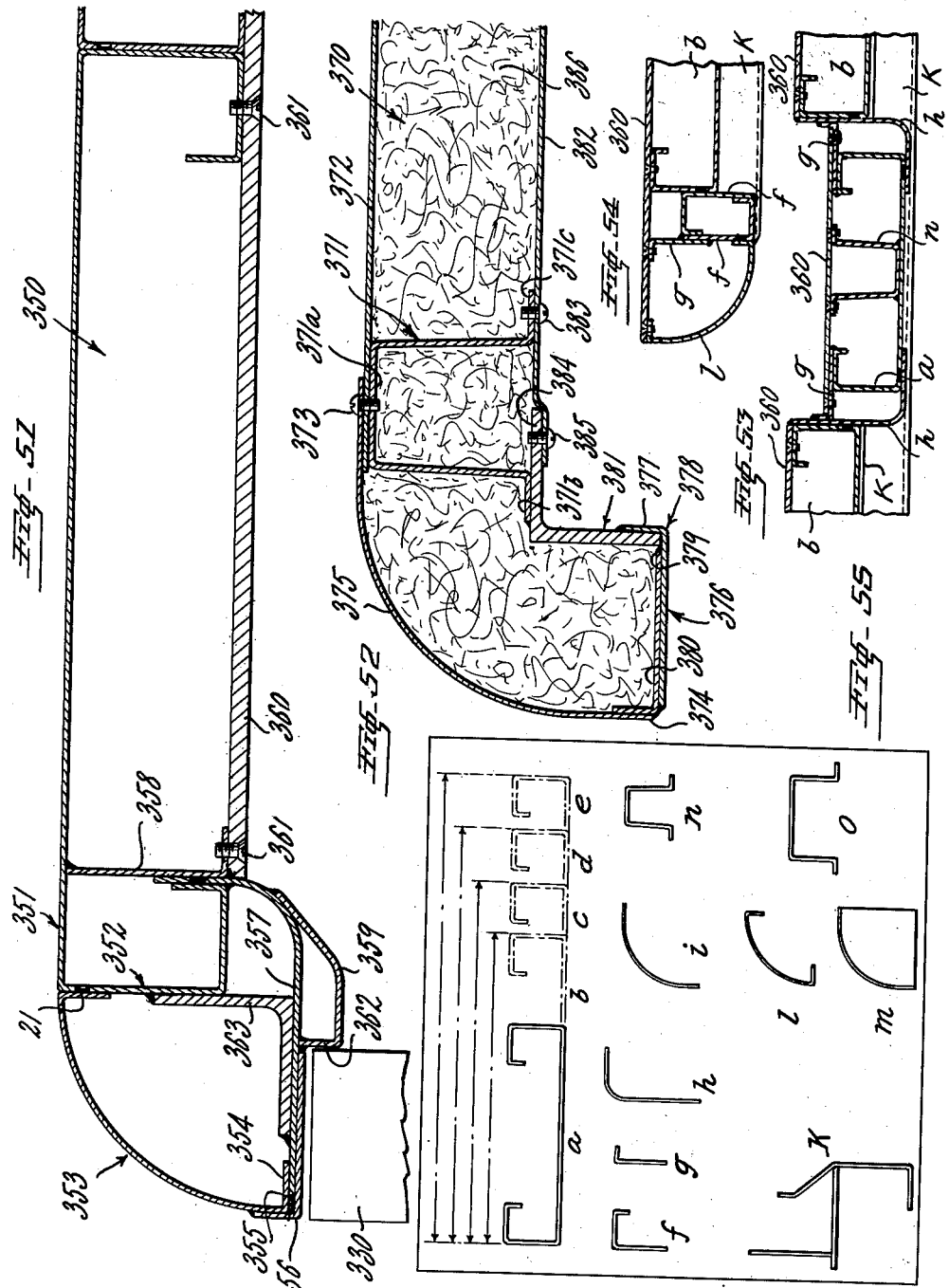

Patented Feb. 19, 1952

2,585,976

UNITED STATES PATENT OFFICE 2,585,976

VEHICLE BODY

Byron Bentley Teeter, Brooklyn, N. Y.; Elsie T. Teeter executrix of said Byron Bentley Teeter, deceased Application May 2, 1947, Serial No. 745,528

10 Claims. (Cl. 189—34)

This invention relates to vehicle bodies or like housings and more particularly to body constructions for trucks and other commercial vehicles.

The existing practice of assembling commercial truck bodies so as to fulfill many various specifications of the respective trades requires framework and a large variety of assorted parts, shapes and plates which must be constantly varied to suit individual designs and sizes of specified vehicular bodies. In other words, each different style and each different size of commercial vehicle body requires a new assembly analysis. This ensues considerable waste of material and an enormous time consumption.

In contradistinction to heretofore known methods of manufacturing vehicle bodies which had to comply with specifications of the practice, the present invention affords a considerably larger flexibility in building such specified bodies, avoids many other difficulties inherent in the known manufacturing methods and has as one of its primary features to provide means ensuring an efficient method of producing body structures with a minimum number of prefabricated metal shapes, cut and formed from stock size sheet material and without any waste thereof.

It is another important feature of the invention to provide means for building body structures of the type referred to, substantially with only two primary building elements which consist of prefabricated metal shapes and standard iron shapes.

A very important feature of this invention is to provide means facilitating quick adjustment of the vehicle body shape and construction so as to comply with all requirements of the practice.

To arrive at this latter result body panel sections are prefabricated and stocked in a large number of consecutive widths and a few number of heights, so that from the stored panel sections those sizes thereof may be selected, which are needed according to the length and width of body walls to be built and the load requirements of the body whereby also varying desirable designs of the exterior of the vehicle body are obtained. Such system of prefabricating and assembling panel sections provides further means of building bodies for specialized utilization which requires many shapes, combinations and arrangements throughout the exterior and/or interior of the vehicle body. This is achieved by the selection of the sizes of panel sections and assembly of the same in any desired direction.

This system of assembling panel sections also permits that the body walls and the doors thereof are strengthened by using panel sections of narrower widths whereas panel sections of wider width are employed where walls of lesser strength are required.

Many further permutations and combinations by arranging panel sections and other prefabricated shapes in upright and/or in horizontal directions with respect to each other are possible to meet the demands of the practice.

It is still another object of this invention to provide means facilitating storage and transportation of vehicle body sections in knocked down or disassembled condition and their speedy assembly at the place where the vehicle bodies are to be used and attached to the vehicle chassis.

A further object of the present invention is to provide means permitting ready interchangeability of the aforesaid body panel sections and their relative and combinational arrangement to each other to bring about prefabricated doors, compartments and the like as integral parts of vehicle bodies which will suit any possible size and style and provide also for the attachment or application of specified equipment thereto such as insulation, linings etc.

Still another object of the present invention is to provide means rendering possible the use of prefabricated metal body panels or parts which during their manufacture by mass production methods are subjected to a straightening-out step, the outer appearance of the bodies in assembled condition being therefore substantially straight, neat and presenting smooth surfaces; the connection of the body panel sections being noticeable only as ornamental symmetrical seams from the outside of the assembled body and dispensing with any molding which is employed in conventional body structures.

Still a further object of the invention is to provide means ensuring a substantially unobstructed inner loading space of the vehicle body, achieving smooth transition and connection of side and end panels at the corners thereof without any projecting parts and permitting the construction of the upper vehicle body portion either with an open top or a closed roof or cover, as desired.

Yet a further object of the present invention is to provide means allowing the erection of sectional vehicle bodies at relatively low cost, with a minimum number of workers and conventional tools.

Still a further object of the present invention is to provide means arranged throughout the assembled vehicle body which may be employed for various purposes, such as heat insulation or the accommodation of electric wiring. The wires may pass directly through the profiled ends or corner structures longitudinally, vertically and crosswise without any obstructions which would otherwise necessitate the drilling of holes in the structure and bypassing of obstructions therein. The panel sections and corner units are so shaped that they easily retain insulating materials therewithin and without the necessity of any special anchoring means.

Yet a further object of the invention is to provide an improved vehicle body which is light in weight, but sturdy in construction, provides strength at vital points, is highly efficient in use and durable in service.

Another object of the present invention is to provide a vehicle body structure composed of metal panel sections of varying widths, which do not require any skeleton or framework and which due to the provision of profiled ends are sufficiently stiffened between openings in the body whereby a considerable saving in time, labor, material and weight is achieved. Due to the fact that the welding of the panel sections is confined to the inside of said profiled ends distortion of the outer surface of the panel sections is entirely eliminated.

Still another object of the present invention is to provide means facilitating speedy replacement and renewal of any damaged panel sections of the body.

Yet a further object of the present invention is to provide means permitting the insertion and fitting of standard iron reinforcing shapes at and within the profiled ends of desired panel sections, wherever and whenever framing is to be formed, for example, for doors, openings and for the attachment of accessories, hooks, etc. to any panel sections.

A still further object of the invention resides in the provision of means for speedy manufacture of the panels employed for the erection of vehicle bodies, one set-up of machinery only being needed to produce various widths of panel sections since the profiled ends thereof always remain the same.

Still a further object of the invention is to provide means facilitating the joining or bonding together, e. g. by slot welds, of adjacent panel sections at desired locations of their profiled ends or flanged edges and further means for sealing the top edges of said panel sections and providing a trim thereat in assembled condition.

In building up bodies according to the present invention, any type of specification which the practice may require may be readily filled, since the walls of such improved vehicle body are so connected with the understucture of the vehicle and braced from the outside against the latter that the arrangement of means in the interior of the body for supporting and anchoring such walls may be eliminated. Such supporting and anchoring means extended in the known, specified body constructions in the interior of the body and obstructed and restricted the effective and practically available space therewith.

It is another object of the invention to provide means for bracing the panel section walls from the exterior thereof, providing the rub or guard rail for the vehicle body with utmost strength, sealing the bottom of the panel sections and also the ends of the cross bars of the understructure whereby stresses exerted at such vital anchoring points are taken up and easily absorbed, so that the life of the vehicle body may be prolonged and compares most favorably with that of heretofore known body structures.

Still a further object of the invention is to provide means interconnecting the lower body panel portions, contributing to an effective joint of the latter to the cross bars of the understructure and permitting the connection with that part of the understructure projecting beyond the outer surface of the panel sections, and further means affording unobstructed attachment of the floor plate with the panel bottom sealing means.

Yet another object of the invention is to provide means finishing the lower portions of the panel walls which project below the floor structure of vehicle bodies of the skirted type and simultaneously forming a splash deflector and guard rail for the vehicle body.

These and other objects are accomplished and this invention accordingly consists of the features of construction, combination of parts and in the unique relations of the members and in the relative proportioning and disposition thereof as appearing on the attached drawings which illustrate several embodiments thereof.

In the drawings:

Fig. 1 is a top plan view of a perforated blank cut from stock sheet metal, from which one of the panel sections or units is produced, to be incorporated in a vehicle or like body made in accordance with the invention.

Fig. 2 is a perspective view (as seen toward the inner face) of two joined panel sections forming part of said vehicle body.

Fig. 3 is a view similar to that of Fig. 2, showing the two joined panel sections interconnected by spaced slats.

Fig. 4 is a fragmentary view in perspective of several joined panel sections made according to the invention and provided with a lining and filled with insulating material.

Fig. 5 is a sectional view taken along line 5—5 of Fig. 3.

Fig. 6 is an enlarged cross-sectional view of an assembly of panel sections placed side by side and provided with different reinforcements.

Fig. 7 is a view similar to that of Fig. 6, but with reinforcement extending in a different direction.

Fig. 8 shows an enlarged cross-sectional view of a corner connection between adjacent walls.

Figs. 9, 10 and 11 show enlarged fragmentary, cross-sectional views of one of the profiled end members of a panel section with reinforcements located therein in various positions.

Fig. 12 is a fragmentary, sectional view taken along line 12—12 of Fig. 8.

Fig. 13 is a perspective view (as seen toward the top) of the upper part of a vehicle body composed of panel sections, parts of said body being broken away.

Fig. 14 is a fragmentary top plan view of a detail of a front corner connection of the vehicle body of Fig. 13.

Fig. 14A is a fragmentary top plan view of a rear corner connection of the vehicle body of Fig. 13.

Fig. 14B is a side elevational view of a corner piece or cap seen in Figs. 13 and 14A.

Fig. 15 is a sectional view taken along line 15—15 of Fig. 13.

Fig. 16 is a perspective view, as seen from above, of the upper part of a vehicle body according to the invention, the open top thereof being provided with attaching means for a removable cover.

Fig. 16A is a sectional view taken along line 16A—16A of a rear corner of the body seen in Fig. 16.

Fig. 17 is a sectional view taken along line 17—17 of Fig. 16.

Fig. 18 is an enlarged top plan view of a front corner connection between side and front panel sections of the body of Fig. 16.

Fig. 19 is an end view and

Fig. 20 is a front elevational view of an angular strip or shape employable in this invention.

Fig. 21 shows in side elevation a portion of a vehicle body wall including a door and composed of panel sections of different width and length made in accordance with this invention.

Fig. 22 is an end view, and

Fig. 23 a front-elevational view of a further angular shape or element employable in this invention.

Fig. 24 shows an end view of the two angular shapes of Fig. 22 in applied and connected condition.

Fig. 25 is a sectional view taken along line 25—25 of Fig. 21.

Fig. 26 is a cross-sectional view taken along line 26—26 of Fig. 21, the door in open position being indicated in dot-dash lines.

Fig. 27 is a sectional view of one end of the body panel sections and of an end of a door cooperating with said end of said panel section.

Fig. 28 is a modified form of the closure of panel section and door, to which reference is made in the specification.

Fig. 29 is a top plan view of the understructure of a vehicle, the body thereof being shown in section and its floor plate partly broken away.

Fig. 30 is a fragmentary vertical sectional view taken along line 30—30 of Fig. 29.

Fig. 31 is a sectional view taken along line 31—31 of Fig. 30.

Fig. 32 is a sectional view similar to that of Fig. 30, but shown in a modified form applied to a special type of vehicle body.

Fig. 33 is an enlarged sectional view of the rear end corner of the panel section, seen in Fig. 29.

Fig. 34 is a side-elevational view of a vehicular specified commercial body made in accordance with this invention.

Fig. 35 is a rear end view of the body of Fig. 34.

Fig. 36 shows a fragmentary cross-sectional view of a door and panel section and employable in connection with the body construction seen in Fig. 34.

Fig. 37 is the assembly of an upright panel section (partly shown) and its connection to a horizontally extending panel section (partly shown), both panel sections having different widths.

Fig. 38 is a perspective view of a connecting element employed for the interconnection between upright and horizontal panel sections.

Fig. 39 is a horizontal, cross-sectional view of a compartment incorporated in the vehicle body of Fig. 34.

Fig. 40 shows a cross-section of one type of reinforcement, and

Fig. 41 the cross-section of another type of reinforcement composed of angular shapes depicted in Figs. 19 and 20.

Fig. 42 indicates in cross-section a reinforced profiled end and a panel section in which an angular shape is employed as depicted in Figs. 22 and 23.

Fig. 43 shows an end view, and

Fig. 44 a front-elevational view of a pre-shaped corner piece employable in this invention.

Fig. 45 shows a sectional view of a reinforced profiled end member of a panel section with the coorner piece of Fig. 43 applied thereto.

Fig. 46 shows a front elevation of a tail gate composed of panel sections of different widths and made in accordance with this invention.

Fig. 47 is a cross-sectional view of the tail gate taken along line 47—47 of Fig. 46.

Fig. 48 is an enlarged sectional view taken along line 48—48 of Fig. 46.

Fig. 49 is an enlarged sectional view of one end of the tail gate.

Fig. 50 is an enlarged sectional view of the upper end of the tail gate as seen in Fig. 48.

Fig. 51 is a horizontal sectional view of a corner of a body wall composed of sections and made in acccordance with this invention.

Fig. 52 is a vertical sectional view of the upper corner end of a vehicular body structure in modified form.

Fig. 53 is a fragmentary horizontal cross-sectional view of a side wall structure in modified form.

Fig. 54 is a sectional view of a corner or end of a side wall structure in a further modified form.

Fig. 55 shows end views of various widths of panel sections and various prefabricated metal shapes or strip-shaped building means referred to in the specification.

Referring now in greater detail to the drawings, there is shown in Fig. 1 a substantially flat metal sheet 20 of appropriate thickness and cut from stock sheet material. Such sheet material has been subjected to a cutting operation and then to a punching operation in which series of perforations 21 and 22 have been provided in said sheet. It will be observed that the series of perforations 21 are arranged in staggered relation with respect to the series of perforations 22, both said series of perforations 21 and 22, leaving imperforated metal sheet parts therebetween. In this instance, perforations 21 and 22 are of elongated shape and are spaced equidistantly from the side edges 25 and 26, respectively. It is further to be noted that the series of perforations 23 and 24 are provided in the sheet according to requirements and preferably after the sheet 20 is provided with profiled or channel-shaped end portions hereinafter referred to. Perforations 23 are disposed closer to the upper edge 27 than the series of perforations 24 with respect to the lower edge 28. It will further be apparent from Fig. 1 that the perforations are preferably arranged in equal distance to each other, respectively, and that the series of perforations 21 and 22 are substantially parallel with each other and so are the series of perforations 23 and 24.

The vehicle body, as more clearly seen in Figs. 13 and 16, is composed of profiled sheet sections which may be manufactured from said sheet 20 as further exemplified by two panel sections 20a, 20b, as seen in Fig. 2.

As can be realized from Fig. 2, sheet 20 is bent with its edges 25 and 26 about suitable dies, as is well known in the art, to bring about profiled end portions or channel-shaped ends 30, 31 so that the series of perforations 21 are arranged on an outer end portion 32, whereas the series of perforations 22 will be located on opposite perforated outer end portion 33 of channel member 31. The remainders of channel members 31 and 30 form inner end portions 34 and 35, the latter being contiguous and in alignment with respect to inner end portions 36 of panel section 20b which, according to Fig. 2 is placed for connection with panel section 20a.

In this position, perforated outer end portion 33 of channel member 31 comes in contact with perforated end portion 37 of the channel member 38 of panel section 20b. It is well understood that the series of perforations of outer end portion 33 are arranged in staggered relation with respect to the perforations provided in outer end portion 37 of panel section 20b so that a welding or other bonding connection through these perforations between the edges defining the latter and respective imperforated parts of contiguous outer end portions 33 and 37 of the channel-shaped panel sections 20a and 20b may be had.

In order to further bring about a reinforced connection between panel sections 20a and 20b, the abutting edges of the inner end portions 35 and 36 of these panel sections may be tack-welded as indicated at 39.

Fig. 3 shows the arrangement of panel sections 20a and 20b in joined condition but interconnected by spaced slats 40, 41 which are fixed to the inner end portions 34, 35, 36 and 42 by any appropriate means, such as bolts 43, 44.

It will be realized that the front or plate portion 45 of panel section 20a and the front or plate portion 46 of panel section 20b form the front or outer face of one of the walls of the vehicle body, as will be later on more fully explained, whereas the slats 40, 41 will run along the inner face of one of the walls of the vehicle body, which slats determine the load capacity of the vehicle.

Fig. 4 shows in perspective the arrangement of panel sections 20a and 20b and further adjacent panel sections 20c and 20d (the latter being shown broken off) in joined condition and provided with an inner wall lining 47 made from any desired sheet material, such as wood and the like. Wood lining 47 is attached to the inner end portions 34, 35, 36 and 42 of the panel sections 20a, 20b by means of stove bolt 48, as may be understood from Fig. 4.

The space between the channel-shaped panel sections 20a and 20b is filled out with any suitable heat or other insulation 49 which may extend from the top to the bottom of the panel sections.

As will be demonstrated hereinafter, the widths of sections 20a, 20b etc. forming the vehicle body may vary. For a given length of the vehicle body the widths of the prefabricated panel sections will be different from each other in order to make up the respective body wall as to its required length, strength (loading weight) and its particular design and shape.

It goes without saying that the panel structure hereinabove referred to results in a rigid, sturdy and efficient wall construction which may be further reinforced in accordance with the disclosure as seen in Figs. 6 to 11, inclusive.

Fig. 6 shows in cross section and on an enlarged scale channel-shaped panel sections 20a, 20b (the latter being shown broken away) carrying within the space 50 reinforcing U-shaped brackets or members 51 and 52 of different dimensions. These reinforcing members 51, 52 extend vertically of the panels and are affixed to the inner panel lining 47 by means of stove bolts 48, as hereinabove described with respect to Fig. 4. Reinforcing members 51 and 52 in this instance, replace the insulation 49. It is further understood that the metallic reinforcing members 51 and 52 are preferably welded at the inner face 45a of the panel section 20a, as indicated at 53.

Fig. 7 shows the arrangement of a reinforcing bracket 54 crosswise to panel section 20a, the flanges 55 of reinforcing member 54 being affixed to the inner lining or wall 47 by means of stove bolts 48. It is of course well understood that the shape and length of the reinforcing members and their arrangement within the channel-shaped bracket sections are chosen in accordance with the requirements of the vehicle body.

Fig. 8 illustrates the attachment of panel section 20a to panel section 20e, the latter forming a part of the front or rear wall of a vehicle body, whereas panel section 20a forms a part of the side wall of such body.

In order to interconnect panel section 20a with panel section 20e, a standard iron shape or angle iron 60 is employed which is fastened to the inner end portion 34 of panel section 20a and inner end portion 61 of panel section 20e at 63 and to the perforated end portion 32 of panel section 20a and perforated end portion 62 of panel section 20e at 64. The outer surface 45 of panel section 20a and outer surface 65 of panel section 20e are interconnected by a corner piece 66 which is also made from standard sheet material and has the inwardly bent extension portions or flanges 67 and 68 for connection with the respective perforated end portions 62 and 32, as may be easily realized.

The series of openings or slots 21 of panel section 20a are employed to bring about welding connection with the respective flange or extension portion 68 which is exposed to view through the series of perforations 21. Similarly, flange 67 which can be reached through perforations 69 of end portion 62 of panel section 20e will be connected to the latter by the welding through slots or perforations 69.

It will be well understood that the space 70 created between the ends of panel sections 20a and 20e and confined by the corner piece 66 may be either reinforced or filled with insulating material, as hereinabove referred to with reference to Figs. 4 and 6. If electric wiring is to be installed in the vehicle body, such wiring may run unobstructedly throughout the entire corner structure space 70.

Figs. 9 to 11 inclusive show various embodiments for the reinforcement of one of the corners or ends of the channel members, say 30, of the panel section 20a. As can be seen from Fig. 9, a standard iron shape 71 is inserted and so located with respect to channel member 30, that flange or leg 72 of the shape 71 extends within the space of channel 30, whereas the flange or leg 73 rests against the outer face of the inwardly turned end 29 of channel member 30 and is connected with the latter by weld seams 74, 75.

Fig. 10 shows iron shape 71 so inserted within the space of channel member 30 that flange or leg 72 extends at the inner face 45a of panel section 20a, whereas flange or leg 73 is situated along the inner face of outer perforated end portion 32.

This angle iron 71 may be affixed for reinforcement within the channel member 30 by suitable weld seams 76 and 77 and may be further attached to perforated end portion 32 through series of perforations 21.

Fig. 11 shows the channel member 30 of panel section 20a reinforced by two angle irons 80 and 81, the flanges or legs 80a and 80b of angle iron 80 extending within the space of channel member 30, whereas the flange or leg 81a extends at the outside of inwardly turned end 29 of channel member 30 and leg 81b into the space of channel member 30 and in abutting relation with flange or leg 80a of angle iron 80. It is well understood that suitable weld seams, such as indicated by numerals 82 and 83 may be employed to affix the angle irons to the channel member 30 of panel section 20a.

Fig. 12 shows a cross section taken along line 12—12 of Fig. 8 and the connections of the abutting perforated walls 33 and 37 of the respective panel sections 20a and 20b. These connections are effected through the respective perforations 22 and 21 of the end portions 33 and 37 and in conformity with the staggered relationship of perforations 22 and 21, as is well understood.

Fig. 13 shows in perspective and as seen toward the cover a vehicle body 90 substantially rectangular in shape and having the side walls 91, front wall 92 and rear wall 93.

Each of these walls is composed of several sections of equal or varying width, as hereinabove described in greater detail. The front corners 94 and 95 are shown in open condition and with the cover or top sheet 96 removed from the vehicle body 90. On top of the corner angle irons 60 there is affixed a rectangularly shaped frame 97 to interconnect the standard angle irons 60 and to brace and stiffen the upper ends of the sectional side, front and rear walls.

On top of the frame 97 there are affixed by means of suitable attaching means, such as weld seams 98, U-shaped top bows 99 which extend in parallel, spaced apart relation to each other and transversely to the vehicle body. These top bows 99 are employed to further strengthen and brace the upper end of the vehicle body.

Further affixed to the upper end of the vehicle body are corner pieces 100 which are affixed on the one hand to the panel sections by welding through the upper series of perforations 23 and on the other hand to the top sheet 96 by means of stove bolts 101 which extend through the corner pieces 100 for connection with top sheet 96. It is self-understood that rear corner piece 102 is connected to the rear wall 93 and top sheet 96 in a similar manner.

It is further to be noted that the upright corner pieces 66 interconnecting side walls 91 and rear wall 93 (see also Fig. 8) are joined to corner pieces 100 and 102 by means of ball caps 103 which overlap by means of their skirted portions 103a, 103b (Figs. 14A and 14B) the ends of respective corner pieces 100, 102 and upper end of corner piece 66.

As can be seen from Fig. 13, the rounded corner pieces 66 have been omitted at the front wall 92 of the vehicle body 90 for the sake of clarity.

Fig. 14 shows on an enlarged scale a fragmentary top plan view of the open upper corner 94 of the vehicle body 90.

Fig. 15 is a cross-sectional view disclosing the connection of top sheet 96 to corner piece 100 and the connection of one of the panels of side wall 91 to corner piece 100 by means of slot-welding through perforations 23 of said panel.

Fig. 16 illustrates in perspective a vehicle body 110 made in accordance with this invention. This body of rectangular shape has the side walls 111 and the front wall 112 (composed of panel sections of the type herein mentioned) which are connected together, respectively, by rounded corner pieces 113 with inwardly bent extension portions (similar to corner piece 66 of Fig. 8). The rear wall of the vehicle body 110 has been eliminated, the outermost profiled end 111a of each last panel section of the opposite side walls 111 being reinforced by three standard angle irons 111b, 111c and 111d welded to the respective profiled ends (Fig. 16A).

At the inner upper end of the walls of the vehicle body 110, which are composed of panel sections made in accordance with this invention, there is affixed an inner web 114 from which extends a finishing strip 115 having a horizontal leg 116 and a downwardly directed leg 117, as can be clearly seen from Fig. 17. This finishing strip 115 closes the upper ends of the panel sections and is affixed through upper perforations 23 of the panel sections to the latter and also at 114a to web 114.

The finishing strip 115, as can be seen from Fig. 16, has spaced apart perforations or openings 118 for the insertion of hooks 119 forming the ends of top bows 120 which are thus arranged in spaced apart relationship from each other and serve the purpose of supporting a sheet of canvas or similar cover to form the top of the vehicle body. Side wall panels 111 and front wall panels 112 carry on the outer surfaces thereof hook-shaped members 121 as attaching means for the canvas cover when the same is applied to the vehicle body, as it is well understood.

Fig. 18 shows on an enlarged scale one of the rounded corner pieces interconnecting front wall 112 with one of the side walls 111 and the arrangement of web 114 relatively to the panel sections and the finishing strip 115.

Fig. 19 shows an end view of the finishing strip 115 made from suitable sheet metal whose leg 117 is angularly directed with respect to leg 116, preferably less than 90°.

The length of leg 116 is preferably determined by the length of outer end portion 32 or 33 (Fig. 2), strip 115 being adaptable for various combinations preferably with angular shape 152 illustrated in Fig. 22.

This finishing strip 115 may be of any suitable length and, as will be hereinafter explained, has many applications in connection with the combinations and permutations contemplated in connection with the arrangements of the panel sections of vehicle or like bodies. Fig. 20 shows the finishing strip or ledge 115 in front elevation.

Fig. 21 shows the side wall 130 of a truck body made in accordance with this invention. In this instance, the side wall 130 of which only a part is shown, consists of a relatively small end panel section 131 to which are successively arranged panels 132 and 133, the latter being larger in width than the former and both said panels 132 and 133 being considerably wider than panel section 131. Toward the front end of the side wall 130 somewhat smaller panel sections 134, 135 of substantially equal width are arranged. These panel sections, as it is well understood, are of the shape as hereinabove explained with respect of Figs. 2 and 4 and their joint lines 136, 137 and 138 run substantially parallel to each other.

As can be further seen from Fig. 21, between panel sections 133 and 134 there is arranged a door 140 having a hinge 139. This door 140 is composed of three panel sections 141, 142 and 143 of equal width, the width of each panel section being less than the width of panel section 131.

In this particular instance, the door 140 extends below leg 117 of the finishing strip 115 to which reference has been made hereinbefore with respect to Figs. 19 and 20 and which strip may be affixed to the upper end of the panel sections in a manner similar that described with respect to Fig. 16. Door 140 extends downwardly below the guard or rub rail 145 of side wall 130 which, as will be hereinafter explained, suitably connects with the understructure 146 of the truck body and further joints the lower end portions of the panel sections along a flange 147. The understructure 146 includes a plurality of U-shaped cross bars 148.

Reference is now made to Fig. 25 which shows a sectional view of the door on an enlarged scale and taken along line 25—25 of Fig. 21. As heretofore stated, each of the panel sections 141, 142 and 143 are substantially of the shape similar to that shown in Fig. 2. Panel section 143, in this instance is closed and finished at its upper end 143a by two finishing strips 115 which extend into two different directions and are arranged in superposed position, as may be easily realized from Fig. 25. The short leg 117 of one of the finishing strips 115 is attached to the upper end 143a of the panel 143 by slot-welding, the slots 23 provided on the upper end of the panel sections (see Fig. 2) being employed to obtain access to the exposed face of the leg 117 of the finishing strip 115. The end 116a of the horizontal leg 116 of the finishing strip 115 is welded to the lower finishing strip 115, as is clearly depicted in Fig. 25.

Thus, a sturdy and effective sealing or termination of the upper ends of the door panel sections 141 to 143 may be brought about which, in this particular instance, are provided with an inner lining plate 150, the latter being affixed to the panel sections by means of suitable screw or like fastening elements 149 (in a manner similar to that shown with respect to lining 47 of Fig. 4).

Above door 140 and interconnecting panel sections 135 and 139 is arranged a hollow structure or unit 151 which is substantially composed of two oppositely arranged angular shapes 152 which are shown in greater detail in Figs. 22 to 24, inclusive.

Fig. 22 shows an end view of angular shape 152 having the legs 153, 154 and 155 of which being of different lengths. Leg 154 forms substantially a right angle to leg 153 whereas leg 155 is substantially parallel to leg 153 and forms a right angle to leg 154.

Thus, angular shape 152 forming one of the strip-shaped building means conforms substantially to the cross-section of each of the profiled end members 30, 31 hereinabove referred to and can consequently be readily applied thereto and combined therewith in many different arrangements (Figs. 25, 42 and 54).

Fig. 23 shows a front elevational view of the angular shape or element 152, seen in Fig. 22; whereas Fig. 24 shows a cross-sectional view of the two angular shapes 152 so connected and combined that a hollow space 156 therebetween is obtained. Thus, hollow structure 151 as hereinabove mentioned, is obtained.

As can be further seen from Fig. 25, attached by welding to the outside of hollow structure 151 is the finishing strip 115 which runs on top and lengthwise of wall 130.

Further affixed as by slot-welding at 157 is a drip plate 158 which is of somewhat similar shape as the finishing strip 115 but for the shortened leg 158a. This drip plate extends above door 140 and projects beyond the front surface thereof. Rearwardly of hollow structure 151, there is affixed an angular shape 159 substantially identical in size and shape with finishing strip 115, the lower portion 159a of the angular shape 159 reaching into the path of the hinged door 140 and forming a stop for the latter.

It is further to be observed that between hollow structure 151 and the upper finished end of the door 140 a slight clearance or gap 160 is provided. As it is further demonstrated in Fig. 25, the panel sections of the door are closed at the bottom thereof by means of a finishing strip 161, also of the shape and size substantially as those of the finishing strip 115. This finishing strip 161 is attached to the panel sections by welding as at 162 and secured to the lining 150 by means of screws or similar fastening means 163.

As will be hereinafter further explained in greater detail, a rub rail 145 is arranged to embrace the projecting ends 148a of the U-shaped cross bars 148. This rub rail 145 is cut off at 145a to give clearance for the opening of the door 140 (Fig. 26). A bias plate 145b is disposed at and connected at 145c in a suitable manner with the extension of rub rail 145, as may be realized from Fig. 21.

Fig. 25 further shows a flat, horizontal base plate 164 extending from the projecting end 148a toward the interior of the vehicle body for connection with the floor plate 165 at 166. This horizontal base plate is affixed to cross bar 148 as by means of welding at 167. Within the cut-out of rub rail 145 determined by the width of door 140, there extends above horizontal base plate 164 a finishing strip 168 with leg 168a thereof directed in downward direction and forming a binding and further reinforcing strip for the guard rail 145 and door opening. Connected with the opposite end of a finishing strip 168 is a flat filler plate 169 which is joined to a stop plate 170 at 171. This stop plate is further attached at 172 to the surface of floor plate 165 and forms an abutment by means of its leg 170a for the lower end of the door panels which are sealed by the finishing strip 161. It is to be emphasized that finishing strip 168 and stop plate 170 may be manufactured from the same shape as the finishing strip 115 hereinabove mentioned.

Fig. 26 shows a section through the door panels taken along line 26—26 of Fig. 21, the door 140 being shown in dotted lines when in open condition, abutting against bias plate 145b and extending within the cut-out 145a of rub rail 145. As will be visualized from Fig. 26, the edge of door 140 is provided with an end or finishing strip 172 affixed to the end of the door 140 as by welding.

Finishing strip 172 has the outwardly projecting leg 173. Shape, material and dimensions of finishing strip 172 correspond substantially to those of finishing strip 115 and demonstrate still a further application of such strip.

Fig. 27 shows an end of a body panel section 180 whose profiled end 181 is reinforced by an angle iron 182 in a manner similar to that shown in Fig. 9. An inner lining 183 is affixed to panel section 180 by suitable fastening means 184, such as stove bolts. Arranged with clearance 185 adjacent the reinforced end 181 of body panel section 180 is a door panel 186 whose profiled end or member 187 is reinforced by a strip element 188 which also forms a stop for the door panel 186 adapted to swing into open condition in the direction of arrow A. Finishing strip or stop 188 may be affixed to the profiled end 187 of door panel section 186 by slot welding, such as indicated at 189, and to inner reinforcing plates 190 and 191 as it is apparent from Fig. 27. The downwardly directed leg 188a of strip member 188 abuts in closed condition of the door panel section 186 against the reinforced end 181 of body panel section 180.

Fig. 28 illustrates an effective sealing of the door panel section 195 which may be swung open in the direction of arrow B. The profiled end 196 of the door panel section 195 is reinforced by angular strip member 197 whose leg 197a forms a stop against the body panel section 198.

Strip member 197 is attached to the profiled end 196 by means of slot welding at 199. Disposed within the space between strip member 197 and profiled end 196 of door panel section 195 and clamped therebetween is a rubber sealing element 200 which in closed position of the door panel section 195 comes to lie against reinforcing strip 201 welded to the profiled end 202 of body panel section 198. This profiled end member 202 of the body panel section 198 may further be reinforced by means of an angular strip member 203 and arranged to extend from within the confines of the profiled end member 202 therewithout. This angular strip member 203 effectively reinforces the profiled end 202 and is connected to the body panel section 198 by welding as indicated at 204.

It will be well understood and gathered from the above that strips or members 197, 201 and 203 are identical in shape, trimmed to dimension and made of the same material as the finishing strip 115 hereinabove referred to.

Reference is now made to the anchorage of the body walls on the understructure of the vehicle and attention is further directed to the arrangement of these walls and their connection with the guard or rub rail, which latter contributes to the absorption of the stresses and other forces exerted against the body structure and to the damping of vibrations to which the vehicle body will be subjected during use.

For the sake of clarity, the proportions of the various parts in Fig. 29 have been disregarded and to elucidate the principle of this invention only a few cross bars 148 of the understructure have been shown.

Fig. 29 is a top plan view of the understructure 220 of a vehicle to which body 221 is connected which is composed of panel sections made in accordance with this invention. These panel sections are shown in section and are designated by numeral 222.

As can be further seen from Fig. 29, the understructure has two lengthwise extending beams 223 and a plurality of transversely extending cross bars 148 of U-shaped formation. The vehicle body is further equipped with an axle 224 suitably supported by bearings (not shown) and provided with a pair of wheels 225. Above axle 224 there is further arranged a cross bar 226 which extends between the pair of beams 223. As can be further seen from the drawing, the distance between the rearwardly arranged cross bars 148 is shorter than the distance between the remaining cross bars. It is further obvious from the drawing that the panel sections 222 forming the side walls 227 are of different width than the panel sections arranged at the front wall 228.

In this particular instance, the opposed end panel sections 222 of the side wall 227 are reinforced at their profiled ends 229, as will be further explained with reference to Fig. 33.

Fig. 30 shows a cross section taken along line 30—30 of Fig. 29. The side panel section 222 of the side wall 227 is reinforced by an upright base plate or skirting 230 which extends the full length of the opposed side walls 227 as well as the front wall 228, as may be seen from Fig. 29, and is welded as at 231 to the inner face of the lower portions of the panel sections. Upright base plate 230 is further connected to horizontal sealing plate 164 which closes the bottom of the panel sections and is welded thereto at 232 as well as to the cross bars 148 at 167.

Further connected at 166 and in abutting relation to horizontal sealing plate 164 is the diamond-tread floor plate 165 which extends within the interior of the vehicle body as indicated in Fig. 29 (partly shown). Cross bar 148 projects beyond the side wall 227 at 148a and is sealed or covered thereat by the rub rail 145. This rub rail is made from sheet metal and seals and finishes the projecting ends 148a of the cross bars 148 at the exterior thereof and therefore includes a lower base portion 145a, an upright portion 145b which projects beyond and angularly to cross bar 148 at 145c to terminate into a flange 147 which is connected with the panel section walls 227 and 228 and exteriorly thereof. It will be observed that rub rail 145 is considerably reinforced by the outwardly projecting end of base plate 164 which stiffens the rub rail beyond the confines of the cross bars 148.

The flange 147 of the rub rail 145 is attached to the respective panel sections 222 through the lower slots 24 thereof to which reference was made hereinabove with respect to Figs. 1 and 2.

It results from the aforesaid explanations that rub rail 145, horizontal base plate 164 and upright base plate 230 form a welded, unitary structure which extends along the lower portions of the walls of the vehicle body, anchors the panel walls effectively on the understructure and, due to its particular formation, this unitary structure is capable of taking up and absorbing stresses and other forces exerted against the vehicle body.

Fig. 31 is a front elevation, partly in section of the structure of Fig. 30.

Fig. 32 illustrates a modified form of the arrangement and construction of the guard rail 240 with splash plate deflector 241 which guard rail is adapted for application to lighter truck or similar vehicular bodies which project preferably below the floor structure of the vehicle. As can be seen from Fig. 32, the end of the U-shaped cross bar 242 carries the downwardly extending panel section wall 243 to which it is welded at 244. This panel wall 243 is further reinforced through upper and lower angle irons 245 and 246 which run along the panel wall 243 and above and below the U-shaped cross bar 242 to which said angle irons are connected as by welding at 247 and 248, respectively.

Fixed to angle iron 245 is the floor plate 250 at 249. Angle iron 245 further limits the extent of an inner lining 251 which is provided at the inner face of the panel wall 243.

As hereinabove stated, panel wall 243 extends below the floor structure and forms a skirt 252. The guard rail 240 terminates in a flange 254 which is affixed through slot weld (perforation 24; see also Figs. 1 and 2) to the panel sections of the panel wall 243 and then extends downwardly to finish and seal the panel sections of the wall at 254. Guard rail 240 further extends from below the panel section wall 243 in upward direction and inwardly to form the aforesaid splash deflector 241 in order to effectively protect the lower body portion against mud, etc.

Fig. 33 shows a typical reinforcement of the outer profiled end 229 of the last panel sections of the opposed side walls 227 on an enlarged scale. The bent and inwardly turned profiled end receives two angle irons 255, 256 which are connected to each other by weld seams 257 and to the profiled end 229 by means of slot welding at 21 and 258. It is to be noted that the slot formation 21 is preferably provided before the sheet material of the panel section is bent to finished profile as hereinabove explained with reference to Figs. 1 and 2.

Further affixed for reinforcement to angle iron 256 is a similar angle iron 260 which is welded at 259 to the inner face of the panel section 222. Thus, a reinforced base is obtained on the outer surface 222a of the panel section 222 for anchoring at 261 and 262 a member 263 provided with opening 264 for receiving the hook of the chain which holds the tail gate (not shown) in position at the open end of the truck body. It is well understood that any other attachments or equipment may be anchored on the reinforced profiled ends of the panel sections, if desired.

A typical example of a commercial, vehicular body made in accordance with this invention is illustrated in side elevation in Fig. 34.

Body 270 includes a wall composed of upright panel sections of relatively larger widths, such as indicated at 271, 272, 273; of horizontal panel sections of relatively larger widths, such as 274, 275; of upright panel sections of narrow widths, such as 276, 277, 278; of horizontal panel sections of narrow widths, such as 279, 280; and of a door built with two panel sections, such as 281 and of further doors made of a single panel section, such as 282, 283, 284 and 285. The body 270 has further the upwardly swingable front door 286 and the downwardly swingable front door 287, each of said doors being manufactured from a single panel section.

Further indicated on body 270 are prefabricated shapes or building means 66, 100, 103 and 115 hereinabove explained in greater detail.

Fig. 35 is an elevational view of the rear end of body 270 with door 288 swingable about horizontal hinge 289 and door 290, all the aforesaid doors and walls being made from panel sections embodying the invention, as depicted in greater detail in Figs. 1 to 12, inclusive.

Reference is now made to Fig. 36 which shows in section, for example, door 285 and part of wall panel section 271 and their engagement with one another in closed position of door 285. Profiled end 291 of panel section 271 is reinforced by angular shape member 292 and the end of door panel 285 is reinforced by an angular shape member 293 (of the same type as seen in Figs. 19 and 20, the latter forming by means of leg or flange 294 an abutment which comes to lie against the surface end of panel section 271. Both angular shapes 292 and 293 are welded to the respective panel sections in appropriate manner, as is well understood.

Fig. 37 shows in perspective two panel sections, such as 276 and 279, connected together and as seen toward the inner faces thereof. Both panel sections are made in a manner as hereinabove described with reference to Figs. 1 and 2. However, panel section 276 extends in an upward direction whereas panel section 279 extends in horizontal direction and at a right angle to panel section 276. In this instance, the perforations 21 and 22 in the outer end portions of the profiled ends 295 and 296 of panel section 279 only have been omitted for the sake of clarity.

In the embodiment shown, an angular shape 152 (see Figs. 22 and 23) is employed which is cut according to Fig. 38 along the dotted lines 152a, 152b so that an intermediate wall portion 154a remains whose length corresponds to the distance between the opposed inwardly turned end portions 29 of the respective profiled ends 297, 298. Consequently, shape 152 extends in transverse direction of said profiled ends 297, 298. Such profiled shape 152 is made from a piece of thin stock size sheet material and then welded to the upper end of panel section 276 to close the same along weld seam 299. The angular shape 152 in its cut form with intermediate portion 154a is illustrated above the connected panel sections 276 and 279 (Fig. 37) whereas the angular piece 152, cut to size to fit with its intermediate portion 154b between and to be flush with the inwardly turned ends 29a of profiled ends 295, 296, is shown at the right hand lower end of Fig. 37. Angular piece or shape 152 is directed transversely to said profiled ends 295, 296.

It is further understood that the length of upper flange 153a of the shape 152 (Fig. 38) corresponds to the inner distance between the perforated outer end portions 32, 33 of section 276, whereas the length of flange 153b fills out in a similar manner the inner distance between the outer end portions of the profiled ends 295 and 296 of panel section 279 and is welded thereto along a seam similar to that exemplified by numeral 299.

It can further be realized that slot welds may be achieved through perforations 22 to attach flange 153b of the adjacent horizontal panel section 279 to the upright panel section 276.

Thus, for instance, an opening for door 281 may be provided below horizontal panel section 279. It goes without saying that shapes 152 as hereinabove referred to, find many forms of application.

Fig. 39 shows the connection of various panel sections to provide an insulated compartment 300. Compartment 300 is confined by an end panel section 301, inner panel sections 302, 303 (the panel section 303 being shorter in width than panel section 302) and the outer panel sections 304, 305. In order to connect these panel sections and to obtain a rectangular inner compartment with suitable walls 306a, 306b, 306c and 306d of lining 306, it will be realized that wall 306a of lining 306 is affixed by means of screw bolts 307 to the profiled ends 308 and 309 of said section whereas wall 306b is fixed to the profiled end 310 by means of bolts 307 on the one hand and to the profiled end 311 by means of a reinforcing piece 312 of the same shape as angular shape 115 (Figs. 19 and 20) on the other hand.

In a similar manner, wall 306c of lining 306 is held in position against inner face of panel section 304 at profiled end 313 by means of angular shape 314 (of the same shape as angular piece 315 of Figs. 19 and 20) whereas the wall 306c is further affixed by means of screw bolt 307 to profiled end 315.

This wall of lining 306 further extends toward panel sections 305 on which it is anchored at its profiled end 316 by means of bolt 307.

Panel section 305 in this instance contains a reinforcement 317 of the type shown and described with respect to Figs. 6 and 7, to which is further applied an angular reinforcing strip 318 which assumes a shape similar to that of reinforcing strip 115 of Figs. 19 and 20. Wall 306c is anchored by means of screw bolt 307 on reinforcing strip 318 which in turn is welded to one end of the U-shaped reinforcement 317.

Wall 306d is affixed to the profiled end 319 of panel section 303 on the one hand and to a reinforcing strip 320 on the other hand, the latter being welded to the profiled end 321 of panel section 303 and also to the profiled end 309 of the panel section 302, as will be obvious from the drawing.

It will be further seen from Fig. 39, that the remainders of panel sections 305 and 307 are devoid of insulating material which has been omitted for clarity's sake.

As will be further seen from Fig. 39, a corner connection 322 joining panel section 301 to panel section 304 extends a certain distance in overlapping relation over the front toward the straight wall portions of sections 301 and 304 and is connected to the later by welding or the like at 323 and 324. The space 325 between sections 301 and 304 may be filled out with insulating material.

Connecting corner piece 322 is shown on an enlarged scale in Figs. 43 and 44 in end view and front-elevational view.

Such corner piece 322 (similar to strip member 115 and angular shape 152) is cut and bent from sheet metal and constitutes a further strip-shaped building means. It has the leg 322a bent out of plane of the remainder 322b of said piece 322. The length of leg 322a is predetermined so as to correspond substantially to the thickness of each panel section (Fig. 45); whereas the length of the remainder of said piece 322 is predetermined so as to extend sufficiently beyond the thickness of the panel section for various combinations and arrangements with the latter and other building means herein mentioned (Figs. 39, 51, 53).

Figs. 40 and 41 show on an enlarged scale two different connections of angular shapes 115 (of Figs. 19 and 20) and which correspond to the shapes 312, 314, 318 and 320 of Fig. 39. It is well understood that these angular shapes are bent and formed from stock size sheet material, may be welded together in various combinations to bring about reinforcements and interconnecting means for adjacent panel sections, may provide for finishing strips or similar bluilding elements in connection with the present invention.

Figs. 42 and 45 show applications of preshaped angular pieces 152 and 322, respectively, to the profiled ends 30, 31 of panel section 20a to which they are connected as by welding or in any other suitable manner.

Fig. 46 shows a front-elevational view of a tail gate 330 for use in connection with the new body structure, which tail gate is composed of outermost sections 331 and 332 of substantially equal width, of inner sections 333 and 334, also of equal width, but larger in width than panel sections 331 and 332, and of intermediate sections 335 and 336 which are of narrower width than panel sections 331 to 334 inclusive. All these panel sections are constructed and connected together in a manner as hereinabove described in greater detail with respect to panel sections 20a and 20b (Figs. 2 to 4).

The inner faces of these conjoined panel sections are reinforced and covered by a suitable lining 337 of sheet metal or the like which extends beyond the reinforced profiled end member 338 of panel section 331 and reinforced profiled end member 339 of panel section 332. To the outer end portions of these profiled end members 338 and 339 are affixed, as by welding, finishing strips 340 and 341 of the type hereinabove described with respect to angular strip 115 shown in Figs. 19 and 20. Thus, a reinforced, sturdy tail gate is obtained whose panel units of the same cross-section are so chosen as to width that such tail gate will effectively withstand the load for which it is constructed.

Fig. 48 shows an enlarged view of a vertical cross-section of the tail gate panel 334 with inner metal lining 337, the edge of upper finishing strip 342 and the edge of lower finishing strip 343 overlapping the front surface 344 of the panel section 334.

Fig. 49 shows an enlarged sectional view of one of the profiled ends, say, 339, of panel section 332 (partly shown) to which the finishing strip 341 is applied, as by welding, and which is welded to the inner tail gate lining 337.

Fig. 50 shows a fragmentary sectional view on an enlarged scale of the upper end of panel 334 with its finishing strip 342 connected to the end of the panel with which further connects inner lining 337 at 345.

Fig. 51 shows a horizontal cross-sectional view of a side wall portion of vehicle body 350 with which the tail gate 330 cooperates. In this instance, panel section 351 has a reinforced profiled end member 352 to which is slot-welded as through perforations 21 corner piece 353, which is similar in shape to the corner piece 66 herein referred to with respect to Fig. 8. To inwardly turned flange 354 of corner piece 353, there is connected as by welding at 355 angular shape 356 and rounded corner shape 357, the former being of the type of the finishing strip 115, seen in Figs. 19 and 20, the latter being of the shape hereinabove described with respect to the shape 322 of Fig. 43. Further reinforcement strips 358 and 359 (of the type as herein described with respect to angular strip 115 of Figs. 19 and 20, of which strip 359, however, is differently bent) are employed to bring about an abutment or frame for the inner lining 360 fixed at 361 and stop means at 362 for the tail gate 330 which is swingably supported with respect to the vehicle body (not shown). A reinforcing standard angle iron 363 is welded to profiled end member 351 and rounded corner shape 357. Thus, a sturdy and strong body end for the tail gate is achieved.

Fig. 52 shows a vertical sectional view of the upper roof structure 370 of a vehicle body built in accordance with the invention. This roof structure 370 has the U-shaped bow member 371 similar to that indicated by numeral 99 of Fig. 13.

Roof cover plate 372 is supported by the upper end 371a of said bow member and held in position thereat by means of screw bolt 373 which further connects to said bow member rounded corner piece 375, similar in constuction to that indicated by numeral 100 of Fig. 13. The lower end 374 of corner piece 375 is welded to a reinforcing strip combination 376 which is substantially similar in construction to the building element of Fig. 40, but for the space left between flange 377 of outer strip member 378 and end 379 of inner strip member 380. In this space fits the end of a standard angle iron 381 to which flange 377 and strip end 379 are welded. Further welded to angle iron 381 is flange 371b of bow member 371. An inner lining 382 is affixed to flange 371c of said bow member by means of screw bolt 383, whereas the extension of inner lining 382 is affixed to the other flange 384 of standard angle iron 381 at 384. As can be further seen from Fig. 52, the spaces between the outer roof cover 372 and inner lining 382 may be filled with any suitable kind of insulating material 386 for the purpose intended.

Fig. 55 shows summarily and diagrammatically various widths of panel sections (a to e), all those prefabricated angular and rounded shapes (f to m), and reinforcing elements (n, o) employed in conjunction with said panel sections to arrive at a body panel structure to which may be applied a door tail gate and compartments also built up of the same type of panel sections which lead to many variations, combinations and permutations of vehicle or similar bodies fulfilling all possible trade specifications therefor.

Fig. 53 illustrates on a reduced scale a fragmentary and horizontal section through a side wall of a body construction, however modified to include between panel sections b of larger width an interconnecting panel a of smaller width and out of alignment with panel b. Fig. 53 further demonstrates the many possible arrangements and combinations of strip-like building means of the form g, h, k and n corresponding to those shown in the chart of Fig. 55. The inner wall of the body has a suitable lining 360 similar to that described with respect to Fig. 51.

Fig. 54 shows a fragmentary, horizontal sectional view on a reduced scale through one end of a body made in accordance with this invention. In this embodiment building means cut from sheet metal with ends thereof bent out of plane are indicated by b, f, g, l and k which also correspond to those indicated in the chart of Fig. 55.

It can thus be seen that the various shapes herein disclosed lend themselves readily to various combinations with each other as well as with the profiled end members of the panel sections and are of the utmost importance for bringing about vehicle body structures flexible in design and configuration as required by the various trades.

This invention consequently provides for a wall structure forming a door for use in connection with vehicles characterized in that said door is composed of at least one metal panel section provided with lateral ends, which are shaped to terminate in flanges forming U-shaped boundaries; and strip-like building means bent from metal sheet material and formed for connection with each other and with some of said flanges of said lateral ends to reinforce and finish the same.

As many possible embodiments may be conceived of the above invention, and as alterations and changes may be made in the embodiments above set forth, it is to be stated that all matters hereinbefore explained or shown in the accompanying drawings, are to be interpreted as illustrative and not in a limitative sense.

Having thus described the invention, what is claimed as new and desired to be secured by Letters Patent, is:

1. A vehicle body structure having side walls and at least one end wall comprising a plurality of metal panel sections forming said walls, each panel section having a substantially straight plate portion, each plate portion terminating into opposed substantially parallel channel-shaped members, each channel-shaped member including an outer end portion, an inner end portion and an inwardly turned end portion, each of said inwardly turned end portions being directed toward said plate portion and terminating a predetermined distance from the latter, said outer end portions being provided with a series of spaced apart perforations having therebetween imperforated parts, the perforation of one of said outer end portions of each panel section being arranged in staggered relation to the perforations of the other of said outer end portions of each panel section, and weld means connecting together said panel sections when placed in abutting relation to each other, said perforations of said outer end portions of one of said panel sections being obstructed by said imperforated parts of adjacent outer end portions of another of said panel sections, said weld means extending through said perforations and fusing the edge of the latter with said imperforated parts of said adjacent outer end portions of said other of said panel sections.

2. A vehicle body structure having side walls and at least one end wall comprising a plurality of metal panel sections to form said walls, each panel section having a substantially straight plate portion, each plate portion terminating into opposed channel-shaped members, each channel-shaped member being U-shaped in cross-section and including an outer end portion, an inner end portion and an inwardly turned end portion, each of said inwardly turned end portions being directed toward said plate portion and terminating a predetermined distance from the latter whereby each panel section is stiffened and provided with a hollow space between said channel-shaped members and said plate portion, said outer end portions being provided with a series of perforations, the perforations of one of said outer end portions being arranged in staggered relation to the perforations of the other of said outer end portions of each panel section, and weld means connecting together said panel sections when the same are placed in abutting relation to each other with their respective outer end portions, said weld means extending through said perforations, respectively and connecting the edges defining said perforations with adjacent outer end portion.

3. A vehicle body structure having side walls and at least one end wall comprising a plurality of metal panel sections, each of said walls being composed of said panel sections, each panel section being provided with a substantially straight plate portion, each plate portion terminating into opposed channel-shaped members, each channel-shaped member including an outer end portion, an inner end portion and an inwardly turned end portion, said outer end portions and said inwardly turned end portions of each panel section extending substantially at right angles with respect to said plate portion, said inner end portion being disposed substantially parallel to said plate portion, each of said inwardly turned end portions being directed toward said plate portion and terminating short of the latter, said outer end portions being provided with a series of perforations, the perforations of one of said outer end portions being arranged in staggered relation to the perforations of the other of said outer end portions, and connecting means bonding said panel sections together and extending through said perforations, respectively of one of said outer end portions to fuse the edges defining said perforations with the adjacent outer imperforated end portion of an adjacent panel section.

4. A vehicle body structure having side walls and at least one end wall comprising a plurality of metal panel sections, each of said walls being composed of said panel sections, each panel section being made of an integral piece of sheet material comprising a substantially straight plate portion and opposed parallel channel-shaped members offset with respect to said plate portion, each channel-shaped member including an outer end portion, an inner end portion and an inwardly turned end portion, said outer end portions and said inwardly turned end portions of each panel section extending substantially at right angle with respect to said plate portion, said inner end portions being positioned between said outer end portions and said inwardly turned end portions and extending substantially parallel to said plate portion, each of said inwardly turned end portions being directed toward said plate portion and terminating short of the latter, said outer end portions being provided with a series of perforations, the perforations of one of said outer end portions being arranged in staggered relation to the perforations of the other of said outer end portions, and connecting means bonding contiguous panel sections together at adjacent outer end portions thereof and extending through said perforations, respectively for association of the edges defining said perforations with the respective adjacent outer imperforated end portions.

5. In a vehicle body structure; a plurality of metal panels forming at least one wall of said body, at least several of said panels being of different width with respect to each other, each panel being provided with a substantially straight plate portion terminating in lateral profiled end members, each end member including an outer end portion, an inner end portion and an inwardly turned end portion, each of said inwardly turned end portions being directed toward said plate portion and terminating a predetermined distance from the latter, said outer end portions being provided with a series of perforations leaving imperforated parts therebetween, the perforations of one of said outer end portions being arranged in staggered relation to the perforations of the other of said outer end portions, and bonding means extending through said perforations, respectively of said panels for association of the edges defining said perforations with contiguous imperforated parts of said panels.

6. In a vehicle body structure, a plurality of joined metal sections forming the walls of said body, at least one of said walls being provided with a closable opening, a door hinged to said wall for closing said opening, said door being composed of a plurality of joined metal panel sections, each of said door and of said wall panel sections being made of an integral piece of sheet material comprising a substantially straight plate portion and opposed parallel profiled end members offset with respect to said plate portion, each end member including an outer end portion, an inner end portion and an inwardly turned end portion, said outer end portions and said inwardly turned end portions of each panel section extending substantially at right angles with respect to said plate portion, said inner end portions being positioned between said outer end portions and said inwardly turned end portions and extending substantially parallel to said plate portion, each of said inwardly turned end portions being directed toward said plate portion and terminating short of the latter, said outer end portions being provided with a series of perforations, the perforations of one of said outer end portions being arranged in staggered relation to the perforations of the other of said outer end portions, weld means connecting together said panel sections of said walls and extending through respective perforations of contiguous outer end portions of said panel sections, means joining together the panel sections of said door, and angularly shaped elements finishing and sealing said door panel sections and affixed to the latter for abutment against said wall panel section adjacent said door opening.

7. A panel joint of the character described comprising at least two metal panel sections, each panel section being provided with a substantially straight plate portion terminating in at least one profiled end member, each profiled end member being offset with respect to the respective plate portion and provided with a row of spaced slots having imperforated parts therebetween, each slot being defined by an edge, the slots of one end member being staggered with respect to the slots of the other end member, and weld means joining said panel sections together, said panel sections when placed with said profiled end members adjacent each other being united by said weld means whereby the latter fuse the edges of said slots of said end members with the respective imperforated parts thereof.

8. A panel joint of the character described comprising at least two metal panel sections, each panel section being provided with a substantially straight plate portion terminating in opposite profiled end members, each profiled end member being offset with respect to the respective plate portion and provided with a row of spaced slots having imperforated parts therebetween, each slot being defined by an edge, the slots of one end member being staggered with respect to the slots of the other end members, corner means joining said panel sections together at adjacent profiled end members of said panel sections, said corner means including flanges for abutment against said adjacent end members, the edges of the slots of said adjacent end members being bonded to said flanges of said corner means.

9. A panel joint of the character described comprising at least two metal panel sections, each panel sections being provided with a substantially straight plate portion terminating in at least one substantially U-shaped end member offset with respect to said plate portion, each end member being provided with a row of spaced slots having imperforated parts therebetween, the slots of one end member being staggered with respect to the slots of the other end member, weld means joining said panel sections together, said panel sections when placed with said profiled end members adjacent each other being united by said weld means whereby the latter fuse the edges of said slots of said end members with the respective imperforated parts, and means accommodated and fixed substantially within the confines of some of said U-shaped end members to reinforce the latter.

10. A panel joint for a wall, door and like structures comprising a plurality of metal panel sections, each panel section being provided with a plate portion terminating in at least one profiled end portion, each profiled end portion being offset with respect to the respective plate portion and being provided with a row of spaced openings having imperforated parts therebetween, each opening being defined by an edge, the openings of one end portion being staggered with respect to the openings of the other end portion, bond means joining said panel sections together, said panel sections when placed with said profiled end portions in contact with each other being united by said bond means, whereby the latter connect the edges of said openings of said end portions with the respective imperforated parts, and means positioned to extend between and in contact with adjacent profiled end portions of two panel sections angularly directed to each other, said latter means including extension portions shaped to overlie respective openings of said adjacent end portions of said angularly directed panel sections and being joined thereto by said bond means.

BYRON BENTLEY TEETER.

REFERENCES CITED

The following references are of record in the file of this patent:

UNITED STATES PATENTS

| Number | Name | Date |
|---|---|---|
| 1,223,912 | Waterman | Apr. 24, 1917 |
| 1,876,198 | Bemis | Sept. 6, 1932 |
| 1,883,141 | Walthers | Oct. 18, 1932 |
| 1,939,732 | Stresau | Dec. 19, 1933 |
| 1,986,998 | Burgess et al. | Jan. 8, 1935 |
| 2,022,869 | Reid | Dec. 3, 1935 |
| 2,059,866 | Hicks | Nov. 3, 1936 |
| 2,101,344 | Reynolds | Dec. 7, 1937 |
| 2,143,288 | Stolz | Jan. 10, 1939 |
| 2,200,159 | Davis, Jr. | May 7, 1940 |
| 2,260,590 | Speck | Oct. 28, 1941 |
| 2,263,510 | Lindsay | Nov. 18, 1941 |
| 2,268,907 | Scott | Jan. 6, 1942 |

OTHER REFERENCES

"Knock-Down All-Aluminum Bodies," by Reynolds, from "Automotive and Aviation Industries" magazine, October 1, 1946, pages 44 and 77.